(12) United States Patent
Zhou et al.

(10) Patent No.: US 11,930,463 B1
(45) Date of Patent: Mar. 12, 2024

(54) TIME SERVICE AND POSITIONING NETWORK SYSTEM FOR UNDERGROUND CHAIN-SHAPED LARGE SPACE IN COAL MINE

(71) Applicants: CHINA UNIVERSITY OF MINING AND TECHNOLOGY, Jiangsu (CN); XUZHOU KERUI MINING TECHNOLOGY CO., LTD., Jiangsu (CN)

(72) Inventors: Gongbo Zhou, Jiangsu (CN); Chuansheng Zhang, Jiangsu (CN); Fan Jiang, Jiangsu (CN); Lianfeng Han, Jiangsu (CN); Shudong Wang, Jiangsu (CN); Xin Liu, Jiangsu (CN); Duifang Gu, Jiangsu (CN); Tao Wang, Jiangsu (CN); Chuansong Wang, Jiangsu (CN); Libing Wang, Jiangsu (CN); Niansheng Liu, Jiangsu (CN); Fuxing Shi, Jiangsu (CN); Dongrun Liu, Jiangsu (CN); Lizheng Li, Jiangsu (CN); Zhencai Zhu, Jiangsu (CN)

(73) Assignees: CHINA UNIVERSITY OF MINING AND TECHNOLOGY, Jiangsu (CN); XUZHIU KERUI MINING TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/260,532

(22) PCT Filed: Sep. 30, 2022

(86) PCT No.: PCT/CN2022/123134
§ 371 (c)(1),
(2) Date: Jul. 6, 2023

(87) PCT Pub. No.: WO2023/206969
PCT Pub. Date: Nov. 2, 2023

(30) Foreign Application Priority Data

Apr. 27, 2022 (CN) .......................... 202210451706.4

(51) Int. Cl.
*H04W 56/00* (2009.01)
*H04B 10/27* (2013.01)
(Continued)

(52) U.S. Cl.
CPC .......... *H04W 56/001* (2013.01); *H04B 10/27* (2013.01); *H04W 64/00* (2013.01); *H04W 84/22* (2013.01)

(58) Field of Classification Search
CPC .... H04B 10/27; H04W 56/001; H04W 64/00; H04W 84/22
(Continued)

(56) References Cited

U.S. PATENT DOCUMENTS 10,736,062 B2 * 8/2020 Malekpour ............... G01S 5/14
2002/0191250 A1 * 12/2002 Graves ............... H04Q 11/0066
398/79
(Continued)

FOREIGN PATENT DOCUMENTS

| CN | 112566236 | 3/2021 |
|---|---|---|
| CN | 112924930 | 6/2021 |

(Continued)

OTHER PUBLICATIONS

Written Opinion of the International Searching Authority, International Patent Application No. PCT/CN2022/123134, dated Jan. 17, 2023, 5 pages.

*Primary Examiner* — Dalzid E Singh
(74) *Attorney, Agent, or Firm* — Casimir Jones, S.C.; Brian F. Bradley

(57) ABSTRACT

The present disclosure discloses a time service and positioning network system for an underground chain-shaped
(Continued)

large space in a coal mine. The system adopts a base station-level network internal time synchronization method which takes an optical fiber time service as a main part and takes a satellite time service as an auxiliary part to construct a time service and positioning network system with an unified time within the ad-hoc network base stations, based on the ad-hoc network base stations linearly arranged in the underground chain-shaped large space in the coal mine. Through the network construction, the network stabilization and the network application, the system unifies the time reference of the base station-level network and improves the positioning accuracy of the network application by utilization of the base station-level network internal time synchronization method. The system integrates the time service and positioning network system suitable for the underground coal mine and expands the network applicability based on an existing underground communication ring network.

6 Claims, 4 Drawing Sheets

(51) Int. Cl.
*H04W 64/00* (2009.01)
*H04W 84/22* (2009.01)

(58) Field of Classification Search
USPC ............................................................ 398/115
See application file for complete search history.

(56) References Cited

U.S. PATENT DOCUMENTS

| | | | |
|---|---|---|---|
| 2015/0247916 A1* | 9/2015 | Bartov | G01S 5/02585 455/456.6 |
| 2019/0025401 A1* | 1/2019 | Vazhenin | H04W 64/00 |
| 2022/0400450 A1* | 12/2022 | McCallum | H04W 72/0446 |

FOREIGN PATENT DOCUMENTS

| | | |
|---|---|---|
| CN | 113438734 | 9/2021 |
| CN | 114585076 | 6/2022 |
| WO | 2015119530 | 8/2015 |

* cited by examiner

TIME SERVICE AND POSITIONING NETWORK SYSTEM FOR UNDERGROUND CHAIN-SHAPED LARGE SPACE IN COAL MINE

TECHNICAL FIELD

The present disclosure relates to a time service and positioning network system, specifically to a time service and positioning network system for an underground chain-shaped large space in a coal mine.

BACKGROUND

In the time service and positioning network system, the two functional parts of time service and positioning are complemented with each other. Time service can provide a sufficiently accurate time reference for positioning to improve its accuracy. Positioning is also an application performance of time service.

The working environment underground coal mines is harsh and the geological conditions are complex and changeable. The mine roadways are long and staggered, and the working areas of miners are scattered and extensive. In addition, it is required to know the positions of some coal materials, mine trucks, equipment and the like at all times, therefore, it is crucial for the accurate positioning underground coal mines.

At present, some independent positioning technologies and some combination of positioning technologies used underground coal mines have their defects and limitations. Bluetooth has a short transmission distance and high power consumption, which makes it not suitable for positioning in coal mine underground environments under limited working conditions. The amount of data transmitted by Zigbee is relatively small. WiFi and UWB have a high cost, but have a good anti-interference and an accurate positioning. However, a more thorny problem for them is the time synchronization of positioning devices.

In view of the above problems, a time service and positioning network system for an underground chain-shaped large-space in a coal mine is provided in the present disclosure. As a sub-network of the time service and positioning network, the time service and positioning network system for the underground chain-shaped large-space in the coal mine unifies the time references of the positioning devices and improves the positioning accuracy mainly through the time service by an utilization of the combination of optical fiber wired time service and satellite wireless time service.

SUMMARY

The objectives of the present disclosure are to provide a time service and positioning network system for an underground chain-shaped large-space in a coal mine. On the basis of the existing communication ring network underground the coal mine, the existing base stations are replaced with ad-hoc network base stations with built-in adjustable crystal oscillator, and a time service and positioning network system is constructed, the time references of the base stations are unified through the time synchronization within the base station-level network, which provides a unified time scale for the wireless positioning, thus improving the positioning accuracy.

A time service and positioning network system for an underground chain-shaped large-space in a coal mine that is configured to implement a positioning of a terminal to be positioned in an underground roadway of a target coal mine is provided in the present disclosure. The system comprises a mining switch, a mining gateway, a mining computer, and a positioning terminal, the mining switch is connected with the mining gateway by an optical fiber, and the mining gateway is connected with the mining computer by a network cable, and the system further includes a time service and positioning network system.

The time service and positioning network system includes at least two ad-hoc network base stations. The ad-hoc network base stations are arranged at equal intervals along the underground roadway of the target coal mine in sequence, and an interval between each two adjacent ad-hoc network base stations is not greater than a sum of communication ranges of the two adjacent ad-hoc network base stations, and a communication range formed by all of the ad-hoc network base stations covers the underground roadway of the target coal mine.

An area between each two adjacent pitheads is divided into two area segments that are adjacent but not overlapped to each other along a direction of the roadway for the area between each two adjacent pitheads in the underground roadway of the target coal mine. Each area segment respectively belongs to a pithead that each area segment abutted to, and an area segment between an end part of the roadway and a pithead adjacent to the end part of the roadway belongs to the pithead, that is, each area segment corresponding to each pithead is obtained.

A starting base station is arranged at a position nearest to the pithead and a position at a fixed interval from the position nearest to the pithead for the each area segment corresponding to each pithead. The starting base stations are numbered base station 1, the ad-hoc network base stations between two adjacent base stations 1 are numbered in sequence in a direction from a position nearest to the base station 1 to a position farthest to the base station 1 until the communication ranges of the ad-hoc network base stations having the same number are intersected.

Each ad-hoc network base station has a same structure. Each ad-hoc network base station includes a time service module with a built-in adjustable crystal oscillator, and a wireless communication module, a backup power supply module, an optical fiber port, and at least one wired expansion interface respectively connected to the time service module, the wireless communication module is connected with the backup power supply module.

Each ad-hoc network base station is connected with the terminal to be positioned by wireless communication signals. The ad-hoc network base stations are connected to each other by optical fibers, and each ad-hoc network base station is connected with the mining switch by the optical fiber.

As a preferred technical solution in the present disclosure, the wireless communication module includes a WiFi module and a UWB module.

A synchronization method based on a time service and positioning network system for an underground chain-shaped large-space in a coal mine comprises the following steps.

In S1, based on each ad-hoc network base station arranged in an underground roadway of a target coal mine, information table data and time reference information between each two adjacent ad-hoc network base stations are transmitted through optical fibers for each group of adjacent ad-hoc network base stations, and a time service and positioning network system with a unified time reference within the adjacent ad-hoc network base stations is constructed.

In S2, the information table data and time reference information between each two adjacent ad-hoc network base stations are transmitted through the optical fibers. For each group of the adjacent ad-hoc network base stations, when an error value for the time reference information transmitted between the adjacent ad-hoc network base stations is less than a corresponding preset error threshold, and a duration of a state that the error value for the time reference information transmitted between the adjacent ad-hoc network base stations is less than the corresponding preset error threshold is greater than a preset time threshold, it is determined that a stable operation of the time service and positioning network system between the adjacent ad-hoc network base stations is implemented. The adjacent ad-hoc network base stations transmit the data to the mining switch, the mining switch sends the data from the adjacent ad-hoc network base stations to the mining computer or a control center to complete an operation of a total time service and positioning network system. Otherwise, it is determined that the stable operation of the time service and positioning network system between the adjacent ad-hoc network base stations is not implemented.

In S3, a communication connection between a terminal to be positioned and the ad-hoc network base station corresponding to a wireless signal cover range where the terminal to be positioned is located is triggered by the terminal to be positioned. The ad-hoc network base station measures position information of the terminal to be positioned, and returns the position information of the terminal to be positioned to the terminal to be positioned, and meanwhile, the ad-hoc network base station transmits the obtained position information of the terminal to be positioned to other ad-hoc network base stations by optical fibers, and the ad-hoc network base station transmits the position information the terminal to be positioned to the mining switch, the mining switch sends the position information of the terminal to be positioned to the mining computer or the control center to complete an application of the time service and positioning network system.

As a preferred technical solution in the present disclosure, S1 includes the following steps.

In S11, for each base station 1 in the time service and positioning network system, a vibration frequency of a built-in adjustable crystal oscillator of each base station 1 is respectively adjusted to a same frequency and a same phase as an atomic clock of a ground satellite based on ground environment.

In S12, for each base station 1, when a stabilization time of the frequency of the built-in adjustable crystal oscillator of the base station 1 based on the ground environment is greater than a preset time, the base station 1 is arranged at a corresponding position in the underground roadway of the target coal mine, then other base stations in an area segment where the base station 1 is located are set up. The information table data is transmitted between the ad-hoc network base stations through the optical fibers and an arrangement and a communication network of the ad-hoc network base stations are completed. And step S13 is proceeded after an arrangement of all of the ad-hoc network base stations in the underground roadway of the target coal mine is completed.

In S13, each base station 1 received a crystal oscillator adjustment signal sent by the control center transmits the time reference information to a base station 2 corresponding to each base station 1, the vibration frequency of the built-in crystal oscillator of the base station 2 is adjusted until an error value for the time reference of the base station 2 is less than the preset error value, therefore, the error values for the time references of all of the ad-hoc network base stations in the area segment where the base station 1 is located are adjusted sequentially, and a time synchronization of the time service and positioning network system is completed.

In S14, an adjustment progress is sent to the mining switch by each ad-hoc network base station, and the adjustment progress of each ad-hoc network base station is sent to the mining computer or the control center by the mining switch.

As a preferred technical solution in the present disclosure, the time reference information in step S2 includes a time reference of the ad-hoc network base station itself, and an error value for the time references between the ad-hoc network base station and the base station 1.

As a preferred technical solution in the present disclosure, the data transmitted between the ad-hoc network base stations in step S2 includes coal mine environment data.

Beneficial effects: Compared with the prior art, the advantages of the present disclosure include as follows.

The present disclosure designs a time service and positioning network system for an underground chain-shaped large-space in a coal mine, which integrates the time service and positioning network system on the basis of the existing underground communication ring network, unifies the time reference of the base stations through the time synchronization within the base station-level network, and improves the positioning accuracy. The ad-hoc network base stations reduce the data conflict on the communication line through the combination of wired and wireless transmission, and improves the data transmission efficiency.

In addition, in terms of time service, the present disclosure adopts the dual time service mode with optical fiber time service as the main part and satellite time service as the auxiliary part according to local conditions, which improves the environmental adaptability of the time service and positioning network system.

DETAILED DESCRIPTION OF THE EMBODIMENTS

The present disclosure will be further described below in combination with the accompanying drawings. The following embodiments are only used to illustrate the technical solutions of the present disclosure more clearly, and cannot be used to limit the protection scope of the present disclosure.

Figure 1:
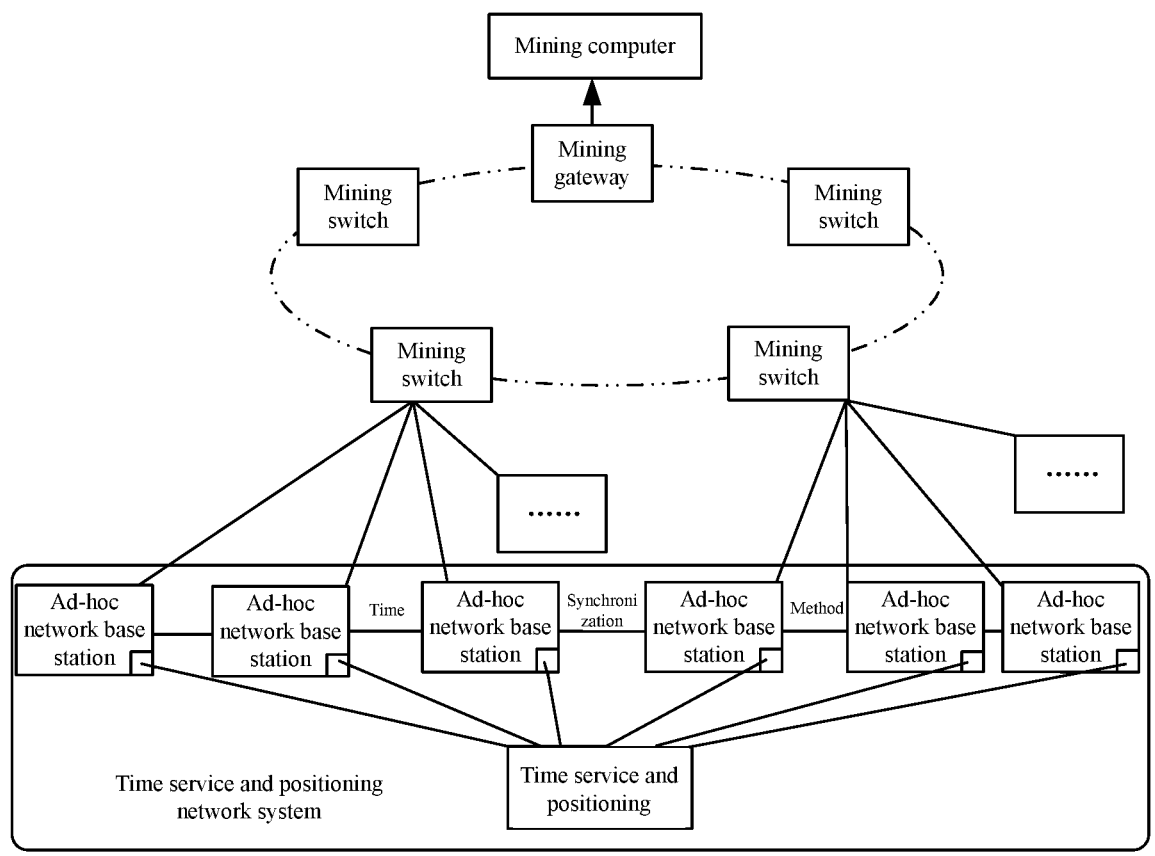
FIG. 1 illustrates a schematic diagram of a coal mine underground communication ring network integrated with a time service and positioning network system.

With reference to FIG. 1, a time service and positioning network system for an underground chain-shaped large-space in a coal mine that is configured to implement a positioning of a terminal to be positioned in an underground roadway of a target coal mine is provided in the present disclosure. The system comprises a mining switch, a mining gateway, a mining computer, and a positioning terminal, the mining switch is connected with the mining gateway by an optical fiber, and the mining gateway is connected with the mining computer by a network cable. The basis of the hardware facilities is an underground communication ring network in a coal mine. The ring network communication equipment above the base station level, such as mining switches, mining gateways and mining computers are used the existing equipment. The key element base station adopts an ad-hoc network base stations with built-in adjustable crystal oscillator.

The system further includes a time service and positioning network system.

Figure 2:
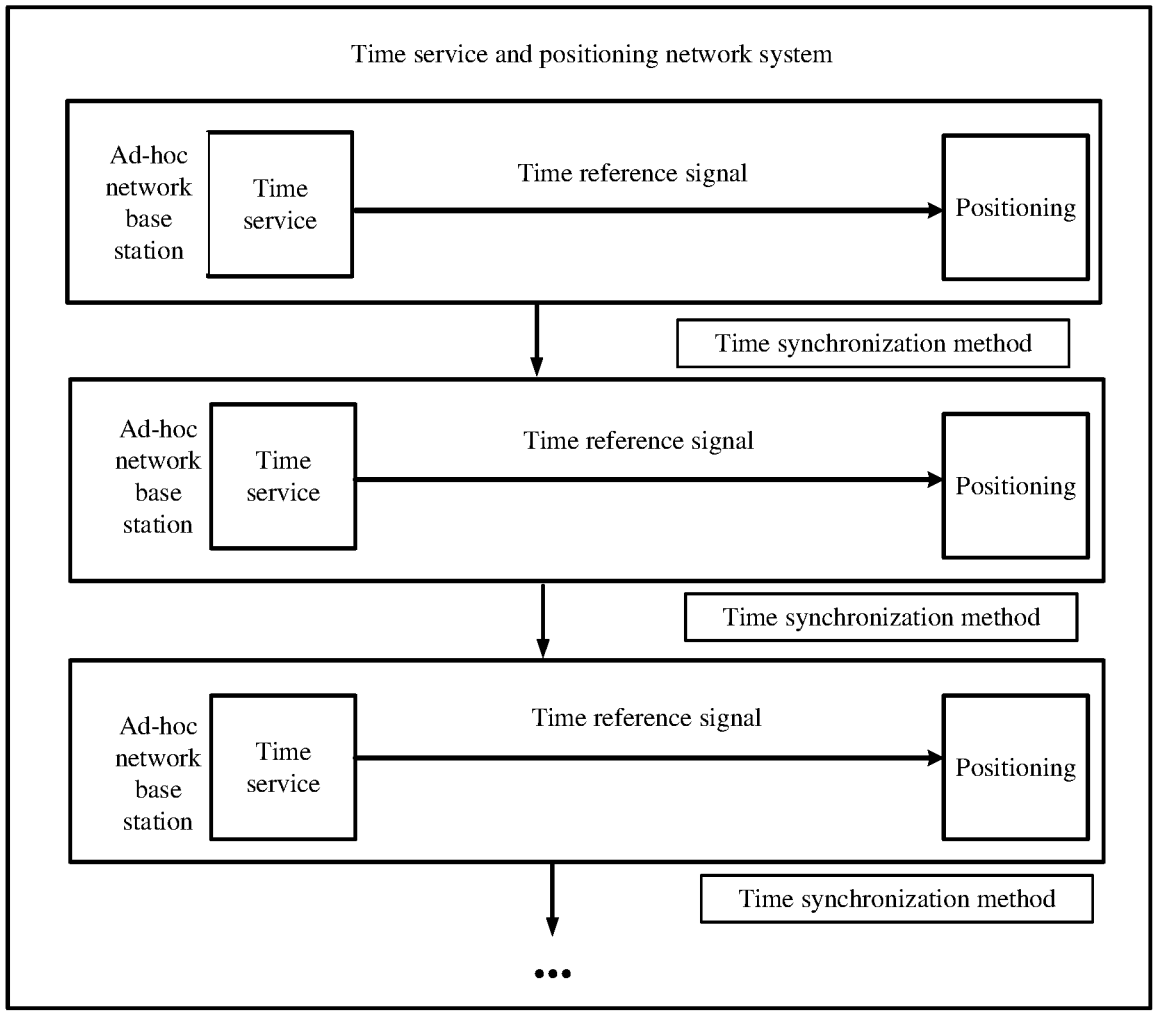
FIG. 2 illustrates a schematic diagram of the time service and positioning network system.

With reference to FIG. 2, the time service and positioning network system includes at least two ad-hoc network base stations. The ad-hoc network base station has the ability to self-organize and construct a network.

Figure 3:
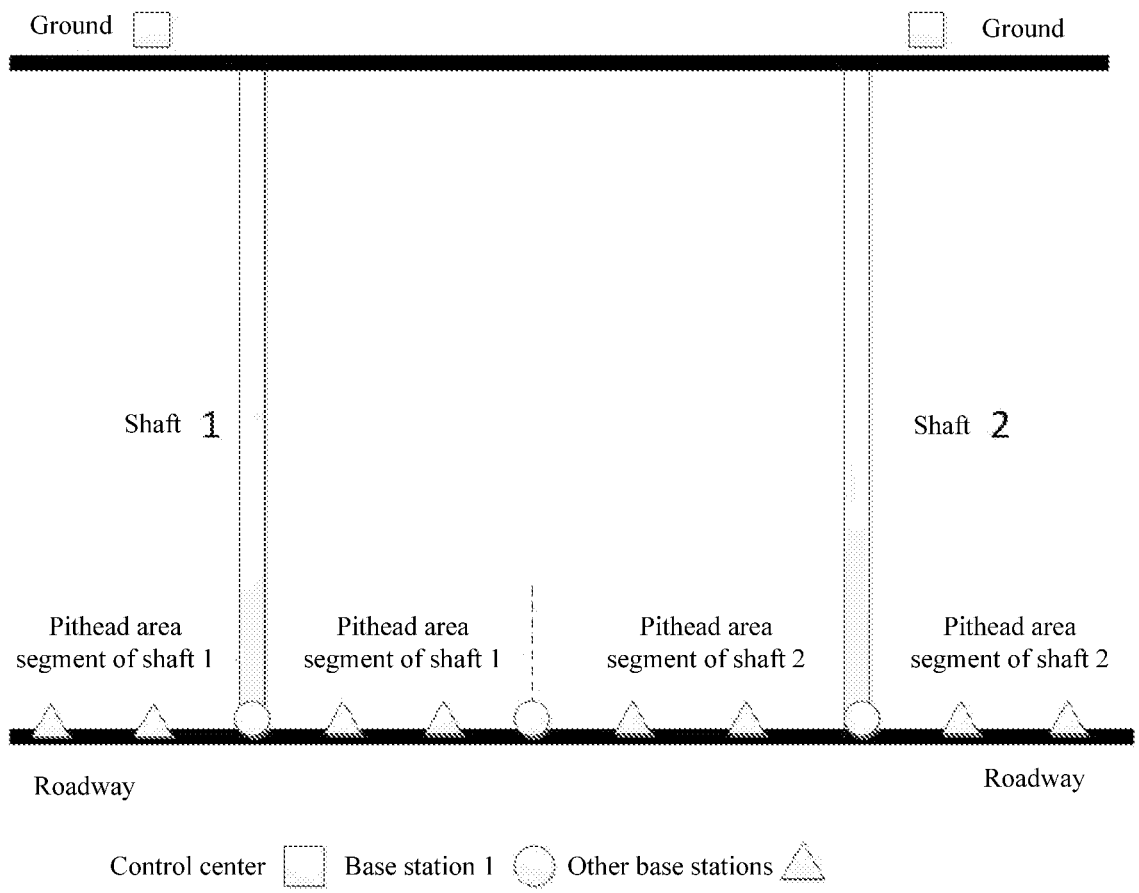
FIG. 3 illustrates a schematic diagram of base stations linearly arranged in an underground chain-shaped large-space in a coal mine.

With reference to FIG. 3, in order to simplify the representation in the figure, the underground chain-shaped roadway and the shafts are simplified as straight lines. According to the environmental characteristics of the underground chain-shaped large-space in the coal mine, the underground coal mine is commonly a linear roadway, and the communication equipment such as base stations are arranged on both sides of the roadway wall, and are arranged at certain intervals. Therefore, the ad-hoc network base stations are arranged at equal intervals along the underground roadway of the target coal mine in sequence, and the interval between each two adjacent ad-hoc network base stations is not greater than a sum of communication ranges of the two adjacent ad-hoc network base stations, and the communication range formed by all ad-hoc network base stations covers the underground roadway of the target coal mine.

For the area between each two adjacent pitheads in the underground roadway of the target coal mine, an area between each two adjacent pitheads is divided into two area segments that are adjacent but not overlapped to each other along a direction of the roadway, and each area segment respectively belongs to the pithead that each area segment abutted to. An area segment between an end part of the roadway and a pithead adjacent to the end part of the roadway belongs to the pithead, that is, each area segment corresponding to each pithead is obtained.

For the each area segment corresponding to each pithead, a starting base station is arranged at a position nearest to the pithead and a position at a fixed interval from the position nearest to the pithead. The starting base stations are numbered base station 1. These base stations 1 are regarded as the internal time reference for the base station-level network. The ad-hoc network base stations between two adjacent base stations 1 are numbered in sequence in a direction from a position nearest to the base station 1 to a position farthest to the base station 1 until the communication ranges of the ad-hoc network base stations having same number are intersected.

Figure 4:
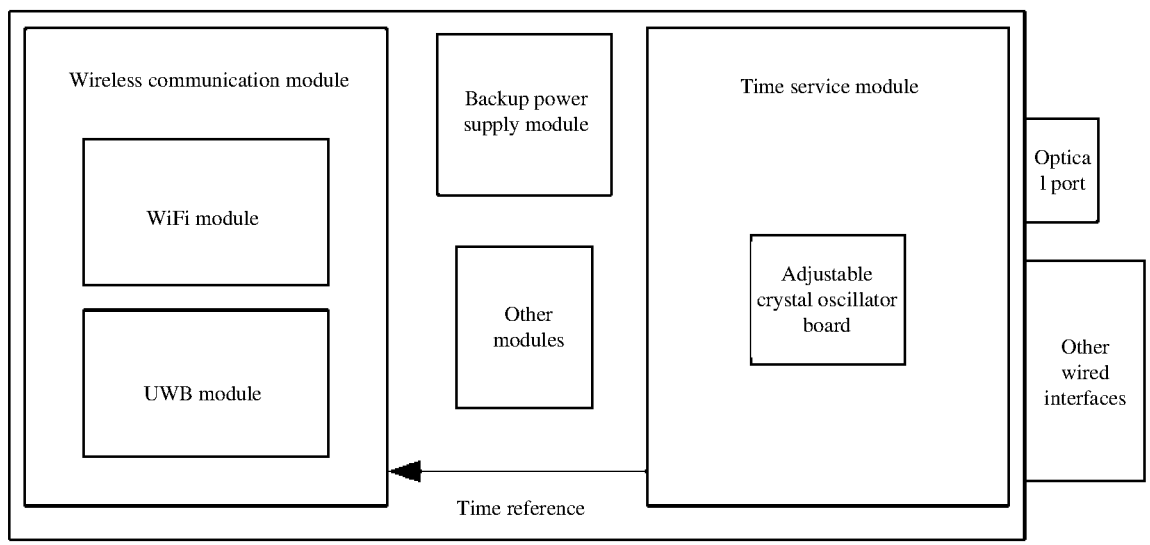
FIG. 4 illustrates a diagram of a composition of ad-hoc network base stations.

With reference to FIG. 4, each ad-hoc network base station has a same structure. Each ad-hoc network base station includes a time service module with a built-in adjustable crystal oscillator, and a wireless communication module, a backup power supply module, an optical fiber port, and at least one wired expansion interface respectively connected to the time service module, the wireless communication module is connected with the backup power supply module. In one embodiment, the time service module is a circuit board transmitting time reference signal data with a built-in adjustable crystal oscillator, which provides time reference signals for other modules inside the base station, and is connected with an optical fiber port outside the base station housing, the optical fiber port is externally connected with an optical fiber signal. The backup power supply module can provide power supply for a period time for the ad-hoc network base station. In addition, the base station housing has a variety of wired signal interfaces, which can expand a variety of different communication methods of the base stations, and includes electrical ports, serial ports and the like.

Each ad-hoc network base station is connected with the terminal to be positioned by wireless communication signals. The ad-hoc network base stations are connected to each other by optical fibers, and each ad-hoc network base station is connected with the mining switch by the optical fiber.

In one embodiment, the wireless communication module includes a WiFi module and a UWB module which are mainly configured to wireless transmit the data and wireless position.

Figure 5:
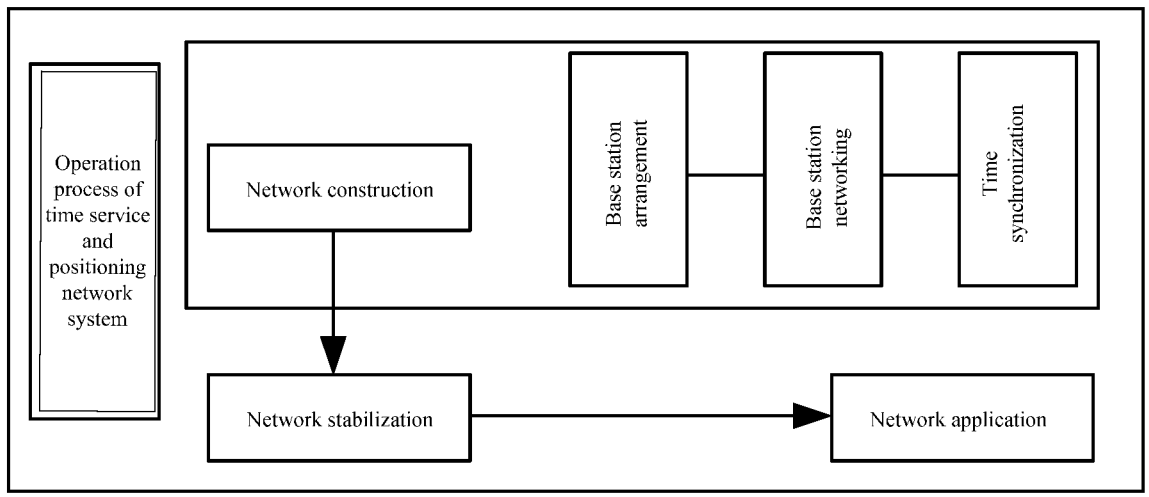
FIG. 5 illustrates a diagram of an operation process of the time service and positioning network system.

With reference to FIG. 5, a synchronization method based on a time service and positioning network system for an underground chain-shaped large-space in a coal mine is provided in the present disclosure, the functions of which lie in the following.

The method provides a time reference for the base station. Due to the reliability of underground data transmission in coal mines, including the problems of wireless signal transmission limited and delayed caused by the electromagnetic interference, different base stations have different time references. The method reduces the timer reference error between the base stations through the combination of the optical fiber timer service and the satellite timer service by introducing the time service, thereby providing conditions for the accurate positioning through a plurality of base stations.

In order to implement the accurate positioning for the underground positioning terminal. The positioning method is a positioning algorithm related to time and distance, which synchronizes the time of each base station in base station-level network through adjustment and provides a unified time reference for the positioning, thereby optimizing the positioning accuracy.

The method includes the following steps.

In S1, based on each ad-hoc network base station arranged in an underground roadway of a target coal mine, information table data and time reference information between each two adjacent ad-hoc network base stations are transmitted through optical fibers for each group of adjacent ad-hoc network base stations, and a time service and positioning network system with a unified time reference within the adjacent ad-hoc network base stations is constructed.

In S2, the information table data and time reference information between each two adjacent ad-hoc network base stations are transmitted through the optical fibers. For each group of the adjacent ad-hoc network base stations, when an error value for the time reference information transmitted between the adjacent ad-hoc network base stations is less than a corresponding preset error threshold, and a duration of a state that the error value for the time reference information transmitted between the adjacent ad-hoc network base stations is less than the corresponding preset error threshold is greater than a preset time threshold, it is determined that a stable operation of the time service and positioning network system between the adjacent ad-hoc network base stations is implemented. The adjacent ad-hoc network base stations transmit the data to the mining switch, the mining switch sends the data from the adjacent ad-hoc network base stations to the mining computer or a control center to complete an operation of a total time service and positioning network system. Otherwise, it is determined that the stable operation of the time service and positioning network system between the adjacent ad-hoc network base stations is not implemented.

In S3, a communication connection between a terminal to be positioned and the ad-hoc network base station corresponding to a wireless signal cover range where the terminal to be positioned is located is triggered by the terminal to be positioned. The ad-hoc network base station measures position information of the terminal to be positioned, and returns the position information of the terminal to be positioned to the terminal to be positioned, and meanwhile, the ad-hoc network base station transmits the obtained position information of the terminal to be positioned to other ad-hoc network base stations by optical fibers, and the ad-hoc network base station transmits the position information the terminal to be positioned to the mining switch, the mining switch sends the position information of the terminal to be positioned to the mining computer or the control center to complete an application of the time service and positioning network system.

Figure 6:
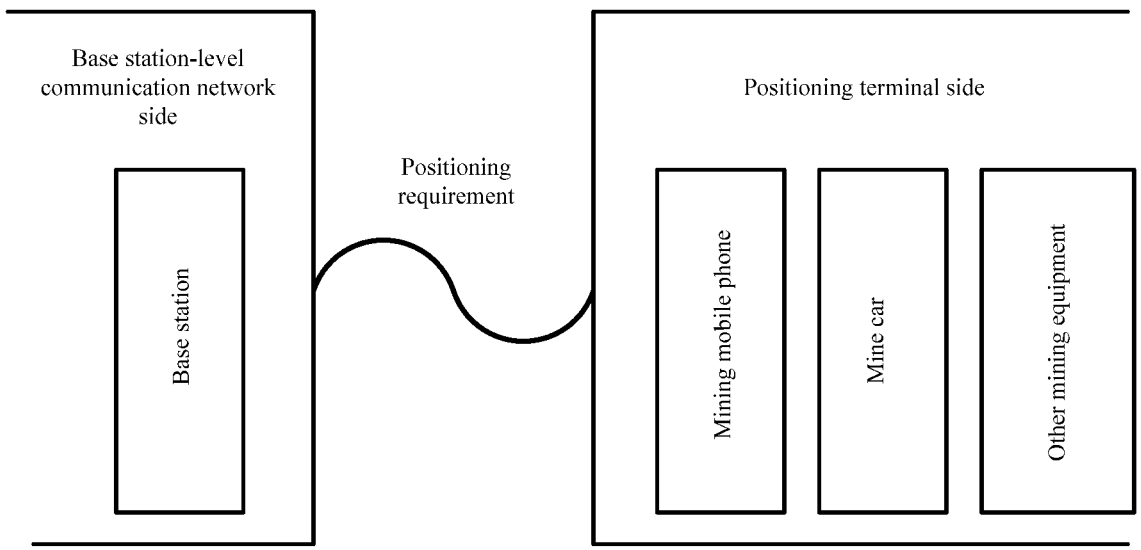
FIG. 6 illustrates a schematic diagram of a network application of the time service and positioning network system.

The process is as shown in FIG. 6. When the mine operators carrying mobile terminals, mining equipment with wireless communication boards and the like move into a coverage of the base station-level network, the wireless communications between the equipment on their own and the base stations are triggered, the base stations collects the information of the positioning terminal, and obtains the position information of the positioning terminal through some positioning algorithms pre-written in the base stations, and returns the information to the positioning terminal, and meanwhile, the base station transmits the information within the base station-level network, and transmits to the mining switch, the mining gateway and the mining computer in sequence.

The step S1 includes the following steps.

In S11, for each base station 1 in the time service and positioning network system, a vibration frequency of a built-in adjustable crystal oscillator of each base station 1 is respectively adjusted to a same frequency and a same phase as an atomic clock of a ground satellite based on ground environment.

In S12, for each base station 1, when a stabilization time of the frequency of the built-in adjustable crystal oscillator of the base station 1 based on the ground environment is greater than a preset time, the base station 1 is arranged at a corresponding position in the underground roadway of the target coal mine, then other base stations in an area segment where the base station 1 is located are set up. The information table data is transmitted between the ad-hoc network base stations through the optical fibers and an arrangement and a communication network of the ad-hoc network base stations are completed. And step S13 is proceeded after an arrangement of all of the ad-hoc network base stations in the underground roadway of the target coal mine is completed.

In S13, each base station 1 received a crystal oscillator adjustment signal sent by the control center transmits the time reference information to a base station 2 corresponding to each base station 1, the vibration frequency of the built-in crystal oscillator of the base station 2 is adjusted until an error value for the time reference of the base station 2 is less than the preset error value, therefore, the error values for the time references of all of the ad-hoc network base stations in the area segment where the base station 1 is located are adjusted in sequence. During this process, the difference between the frequency of the adjustment crystal oscillator in each base station and the frequency of the previous base station is gradually reduced until the time references of the base stations in the entire network are unified or the timer reference error between two base stations is kept within a tolerable minimum error range, that is, the time synchronization within the base station-level network is realized, and the time synchronization of the time service and positioning network system is complete.

Figure 7:
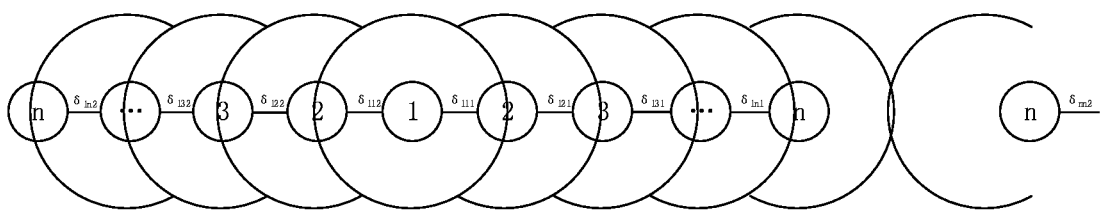
FIG. 7 illustrates a flowchart of a time synchronization method.

In one embodiment, with reference to FIG. 7, during the time synchronization process, base station 1 and base stations 2 adjacent thereto are adjusted respectively to reduce the time reference errors $\delta_{111}$ and $\delta_{112}$ between base station 1 and base stations 2 to 0 or within a tolerable range. Then, base stations 2 and base stations 3 adjacent thereto are adjusted, and the time references errors $\delta_{121}$ and $\delta_{122}$ between base stations 2 and base stations 3 are respectively adjusted on the premise that the fluctuation range $\delta_{111}$ and $\delta_{112}$ between base stations 2 and base stations 1 is not large. All of the ad-hoc network base stations in the area where base station 1 is located are adjusted in sequence according to the same rules until the communication range of the outermost base station corresponding to the base station 1 is intersected to the communication range of the outermost base station corresponding to another base station 1, that is, the time synchronization within the entire base station-level network is implemented.

In S14, an adjustment progress is sent to the mining switch by each ad-hoc network base station, and the adjustment progress of each ad-hoc network base station is sent to the mining computer or the control center by the mining switch.

The time service and positioning network system is mounted to the underground communication ring network through the ad-hoc network base stations. The system maintains the existing communication ring network to transmit a plurality of types of data while incorporating time reference information transmission within the base station level, and all data information is transmitted through the equipment such as mining switches, mining gateways and mining computers, and displayed on the control center screen.

The time reference information in step S2 includes the time reference of the ad-hoc network base station itself and the error value for the time references between the ad-hoc network base station and the base station 1.

The data transmitted between the ad-hoc network base stations in step S2 includes coal mine environment data.

The data transmitted within the base station-level network includes the monitored environmental data including the underground temperature and humidity, the gas concentration and the like; the information table data of the ad-hoc network base station including the ID of the ad-hoc network base station, the position coordinates of the ad-hoc network base station and the like; the information data of the mobile terminal within the coverage of the ad-hoc network base station including the information of mining mobile phones, mining truck equipment and the like within the coverage of the ad-hoc network base stations. In addition, the data further includes the time reference signal data generated by the time service module in the ad-hoc network base station, including the time reference of the ad-hoc network base station itself and the time reference error between the ad-hoc network base station and the reference base station.

The embodiments of the present disclosure are described in detail above in combination with the accompanying drawings, but the present disclosure is not limited to the above-mentioned embodiments, various changes can be made within the scope of the knowledge possessed by those of ordinary skilled in the art without departing from the objectives of the present disclosure.

What is claimed is:

1. A time service and positioning network system for an underground chain-shaped large space in a coal mine, configured to implement a positioning of a terminal to be positioned in an underground roadway of a target coal mine, comprising a mining switch, a mining gateway, a mining computer, and a positioning terminal, wherein the mining switch is connected with the mining gateway by an optical fiber, and the mining gateway is connected with the mining computer by a network cable, and the system further includes a time service and positioning network system;

the time service and positioning network system includes at least two ad-hoc network base stations, the ad-hoc network base stations are arranged at equal intervals along the underground roadway of the target coal mine in sequence, and an interval between each two adjacent ad-hoc network base stations is not greater than a sum of communication ranges of the two adjacent ad-hoc network base stations, and a communication range formed by all of the ad-hoc network base stations covers the underground roadway of the target coal mine;

an area between each two adjacent pitheads is divided into two area segments that are adjacent but not overlapped to each other along a direction of the roadway for the area between each two adjacent pitheads in the underground roadway of the target coal mine, and each area segment respectively belongs to a pithead that each area segment abutted to, and an area segment between an end part of the roadway and a pithead adjacent to the end part of the roadway belongs to the pithead, that is, each area segment corresponding to each pithead is obtained;

a starting base station is arranged at a position nearest to the pithead and a position at a fixed interval from the position nearest to the pithead for the each area segment corresponding to each pithead, the starting base stations are numbered base station 1, the ad-hoc network base stations between two adjacent base stations 1 are numbered in sequence in a direction from a position nearest to the base station 1 to a position farthest to the base station 1 until the communication ranges of the ad-hoc network base stations having a same number are intersected;

each ad-hoc network base station has a same structure, each ad-hoc network base station includes a time service module with a built-in adjustable crystal oscillator, and a wireless communication module, a backup power supply module, an optical fiber port, and at least one wired expansion interface respectively connected to the time service module, wherein the wireless communication module is connected with the backup power supply module; and each ad-hoc network base station is connected with the terminal to be positioned by wireless communication signals, the ad-hoc network base stations are connected to each other by optical fibers, and each ad-hoc network base station is connected with the mining switch by the optical fiber.

2. The time service and positioning network system for the underground chain-shaped large space in the coal mine according to claim 1, wherein the wireless communication module includes a WiFi module and a UWB module.

3. A synchronization method based on a time service and positioning network system for an underground chain-shaped large space in a coal mine, comprising following steps:

S1, transmitting, through optical fibers, information table data and time reference information between each two adjacent ad-hoc network base stations, for each group of adjacent ad-hoc network base stations based on each ad-hoc network base station arranged in an underground roadway of a target coal mine; and constructing a time service and positioning network system with a unified time reference within the adjacent ad-hoc network base stations;

S2, transmitting, through the optical fibers, the information table data and time reference information between each two adjacent ad-hoc network base stations; determining, when an error value for the time reference information transmitted between the adjacent ad-hoc network base stations is less than a corresponding preset error threshold and a duration of a state that the error value for the time reference information transmitted between the adjacent ad-hoc network base stations is less than the corresponding preset error threshold is greater than a preset time threshold, a stable operation of the time service and positioning network system between the adjacent ad-hoc network base stations, for each group of the adjacent ad-hoc network base stations; transmitting, by the adjacent ad-hoc network base stations, data to a mining switch; sending, by the mining switch, data from the adjacent ad-hoc network base stations to a mining computer or a control center to complete an operation of a total time service and positioning network; otherwise, determining that the stable operation of the time service and positioning network system between the adjacent ad-hoc network base stations is not implemented;

S3, triggering, by a terminal to be positioned, a communication connection between the terminal to be positioned and the ad-hoc network base station corresponding to a wireless signal cover range where the terminal to be positioned is located; measuring, by the ad-hoc network base station, position information of the terminal to be positioned; and returning, by the ad-hoc network base station, the position information of the terminal to be positioned to the terminal to be positioned; meanwhile, transmitting, by the ad-hoc network base station, the obtained position information of the terminal to be positioned to other ad-hoc network base stations through the optical fibers; and transmitting, by the ad-hoc network base station, the position information of the positioning terminal to the mining switch; and sending, by the mining switch, the position information of the positioning terminal to the mining computer or the control center to complete an application of the time service and positioning network system.

4. The synchronization method based on the time service and positioning network system for the underground chain-shaped large space in the coal mine according claim 3, wherein S1 includes following steps:

S11, adjusting, based on ground environment, a vibration frequency of a built-in adjustable crystal oscillator of each base station 1 to a same frequency and a same phase as an atomic clock of a ground satellite, for each base station 1 in the time service and positioning network system;

S12, arranging, when a stabilization time of the frequency of the built-in adjustable crystal oscillator of the base station 1 based on the ground environment is greater than a preset time, the base station 1 at a corresponding position in the underground roadway of the target coal mine, for each base station 1, then setting up other base stations in an area segment where the base station 1 is located; transmitting, through the optical fibers, the information table data between the ad-hoc network base stations; completing an arrangement and a communication network of the ad-hoc network base stations, and proceeding step S13 after an arrangement of all of the ad-hoc network base stations in the underground roadway of the target coal mine is completed;

S13, transmitting, by each base station 1 receiving a crystal oscillator adjustment signal sent by the control center, the time reference information to a base station 2 corresponding to each base station 1; adjusting the vibration frequency of the built-in crystal oscillator of base station 2 until an error value for the time reference of the base station 2 is less than the preset error value, thus adjusting the error values for the time references of all of the ad-hoc network base stations in the area segment where the base station 1 is located sequentially, and completing a time synchronization of the time service and positioning network system; and S14, sending, by each ad-hoc network base station, an adjustment progress to the mining switch; and sending, by the mining switch, the adjustment progress of each ad-hoc network base station to the mining computer or the control center.

5. The synchronization method based on the time service and positioning network system for the underground chain-shaped large space in the coal mine according to claim 3, wherein the time reference information in step S2 includes a time reference of the ad-hoc network base station itself, and an error value for the time references between the ad-hoc network base station and the base station 1.

6. The synchronization method based on the time service and positioning network system for the underground chain-shaped large space in the coal mine according to claim 3, wherein the data transmitted between the ad-hoc network base stations in step S2 includes coal mine environment data.

\* \* \* \* \*